Figure 1:
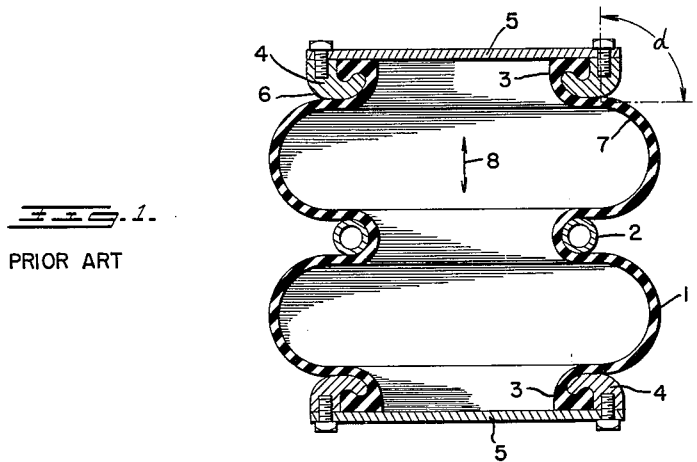

Sept. 12, 1961     J. MÜLLER ET AL     2,999,681

SPRING BELLOWS FOR AIR SPRING SYSTEMS

Filed March 15, 1957

*INVENTORS*
JOSEF MÜLLER
FRIEDRICH H. VAN WINSEN
ALFRED G. ZIMMER

BY *Dike and Craig*

ATTORNEYS

United States Patent Office 2,999,681
Patented Sept. 12, 1961

2,999,681
SPRING BELLOWS FOR AIR SPRING SYSTEMS
Josef Müller, Stuttgart-Riedenberg, Friedrich H. van Winsen, Kirchheim-Teck, and Alfred G. Zimmer, Stuttgart, Germany, assignors to Daimler-Benz Aktiengesellschaft, Stuttgart-Unterturkheim, Germany
Filed Mar. 15, 1957, Ser. No. 646,373
Claims priority, application Germany Mar. 27, 1956
5 Claims. (Cl. 267—65)

The present invention relates to a spring bellows made, preferably, of rubber or the like, for pneumatic spring systems in vehicles, especially in motor vehicles, in which the connecting portions of the bellows are secured to sealing plates or the like by means of annular beaded rings.

The present invention consists in that the part of the bellows wall directly following these connecting portions and which in the spring's normal rest position is spaced from the outer surface of the beaded rings referred to, forms in this normal rest position an angle of no more than 30° preferably, however, 10° with the direction of spring movement of the bellows.

In known constructions of spring bellows, the parts of the bellows walls which are directly connected with and immediately follow the connecting portions thereof and which are spaced in the normal rest position of the spring system from the outer surface of the beaded rings, form an angle of approximately 90° with the direction of spring movement. As a result thereof, the angle between the bellows wall and spring movement, as measured along the spring path, changes greatly in the central region of the spring movement and thereby causes a considerable increase in the spring force since this angle determines the amount of force which the bellows wall contributes over the connection thereof at the beaded ring to the over-all spring force.

In contradistinction thereto, in a bellows construction according to the present invention, the angle between the bellows wall and the direction of spring movement changes only relatively insignificantly in the central region of spring movement so that a sufficiently soft spring system, especially also for passenger motor vehicles, may be obtained.

According to a further feature of the present invention, in a spring bellows in which the bellows connecting portions are disposed on a smaller diameter as compared to the largest diameter of the bellows, the outer surfaces of the beaded rings, against which the bellows walls do not abut in the normal rest position of the spring system, may extend parallel to the spring direction of the spring bellows.

Accordingly, it is an object of the present invention to provide a construction of bellows for air spring systems which provides a relatively smooth and soft spring suspension, particularly for passenger motor vehicles.

It is another object of the present invention to provide such a construction and arrangement of the connection of the spring bellows walls with the sealing plates as to assure an essentially constant, smooth spring action by the pneumatic spring suspension.

It is still another object of the present invention to provide a bellows construction for pneumatic spring systems which offers essentially constant spring characteristics or spring characteristics which vary only relatively little during spring movements thereof.

Still another object of the present invention is the provision of a bellows construction which maintains essentially constant the part of spring force contributed by the bellows walls over the connection thereof with the securing members during at least a very large part of the entire spring movement of the bellows.

Still another object of the present invention resides in the provision of a connection of the spring bellows to sealing plates or the like which maintains essentially constant the base surface of the bellows determinative of the spring force offered thereby.

Figure 2:
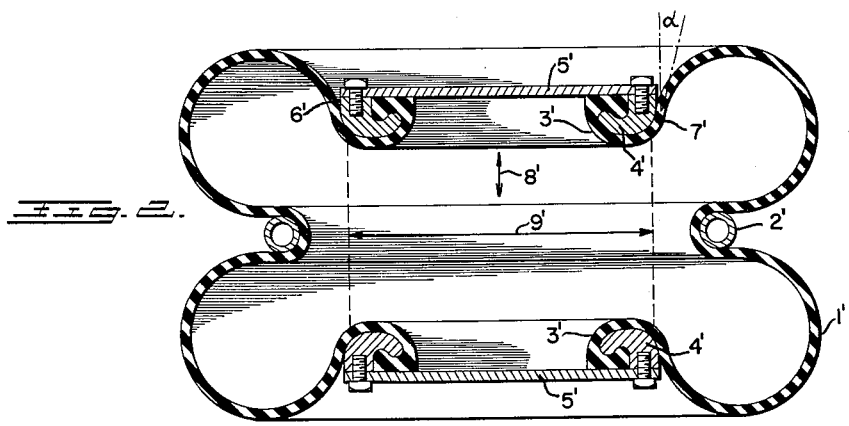
Figure 3:
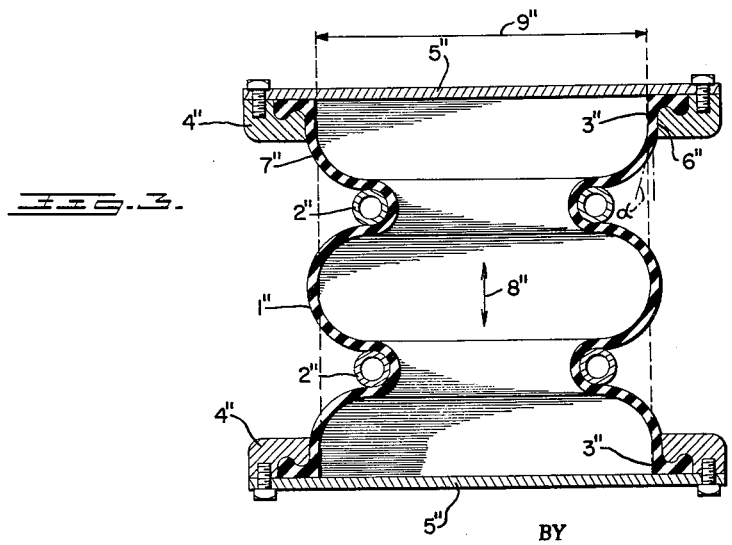

These and other objects, features, and advantages of the present invention will become more obvious from the following description when taken in connection with the accompanying drawing which shows, for purposes of illustration only, several embodiments in accordance with the present invention and wherein FIGURE 1 is a cross sectional view through a spring bellows secured to a sealing plate by means of a beaded ring according to known prior art constructions, FIGURE 2 is a cross sectional view through a spring bellows secured to a sealing plate by means of a beaded ring in accordance with the present invention in which the bellows connecting portions are disposed on a smaller diameter as compared to the maximum bellows diameter, and FIGURE 3 is a cross sectional view through a modified embodiment of a spring bellows secured to a sealing plate by beaded rings in accordance with the present invention in which the bellows connecting portions are disposed along a larger diameter as compared to the smallest bellows diameter of the bellows.

Referring now to the drawing wherein like reference numerals are used throughout the various views to designate like parts, reference numerals 1, 1' and 1'' designate in the three figures of the drawing the spring bellows which comprise unitary wall means and which are each suitably reinforced by reinforcing or girder rings 2, 2', 2'' of any suitable construction. In each case, the spring bellows 1, 1', 1'' are securely retained at both connecting portions 3, 3', 3'' thereof against the sealing plates 5, 5', 5'' by means of annular beaded rings 4, 4', 4'', suitably secured to the sealing plates 5, 5', 5'' as, for example, by means of bolts. The beaded rings 4, 4,', 4'' cooperate with the complementarily shaped connecting portions 3, 3', 3'' of the bellows 1, 1', 1'', as becomes clear from an inspection of all three figures.

In the known prior art construction of a spring bellows illustrated in FIGURE 1, the portions of the bellow walls 7 which immediately follow the connecting portions 3 of the bellows 1 in the direction toward the center portions thereof and which during normal rest position of the spring extend at a distance from the outer surface 6 of the beaded rings 4, form in the aforementioned normal position an angle α approximately equal to 90° with the direction of spring movement 8 of the bellows.

In contradistinction thereto, in bellows constructions according to the present invention as illustrated in FIGURES 2 and 3, the further portions 7', 7'' of the bellows walls directly following the connecting portions 3', 3'' thereof which in the normal rest position of the spring extend from the latter portions at a distance from the outer surface of the beaded ring 4' and from the inner surface of the beaded ring 4'' form in the aforementioned normal position an angle α of maximum 30° with the direction of the spring movement 8', 8''.

As is apparent from the foregoing and from a consideration of the showings of FIGURES 2 and 3, the connecting portions 3', 3'' are those of shapes complementary to and in contact with surfaces on the beaded rings 4', 4'', which may be termed contact surfaces.

In the case of the FIGURE 3 showing, these connecting portions by nature of their definition necessarily terminate at the terminations of the corresponding complementary surfaces of these rings. The latter terminations, as shown in FIGURE 3, are spaced inwardly from sealing plates 5'' in the direction of spring movement. The angles not exceeding 30° formed by the portions 7'' with a line extending in the direction of spring movement have their apices located at the terminations of portions 3″, since it is from these terminations that the portions 7″ extend. Similarly, in the case of the FIGURE 2 embodiment, the portions 7′ extend from the terminations of the portions 3′. These portions, as in the case of portions 3″, are characterized by surfaces thereon which are complementary to corresponding surfaces of the beaded rings 4′. As shown in FIGURE 2, these surfaces of portions 3′ and rings 4′ cease to complement each other at points disposed inwardly axially of the outer faces of the rings and these points thus determine the terminations of portions 3′ in the outward axial direction. From these terminations the portions 7′ extend.

As a result thereof, with intermediate spring movements of the spring bellows 1′, 1″ according to FIGURES 2 and 3, i.e., in the case of down or upward movements of one part of the spring in relation to another, the angle α changes relatively little in relation to the spring movement in an arrangement according to the present invention as contrasted to the prior art. Consequently, the only relatively slight change in the angle α cannot result in a considerable increase in the spring force and therewith in greater stiffness of the spring as would be the case in connection with the construction of FIGURE 1 where the angle α changes considerably.

In the embodiment according to FIGURE 2, the bellows walls do not abut against the outer surfaces 6′ of the beaded rings 4′ in the normal rest position of the spring because the outer surfaces 6′ extend essentially parallel to the direction of spring movement 8′. As a result thereof, during spring movements, it is possible to achieve by the use of such an arrangement that the base surface of the spring bellows which, aside from a large change in the angle α, is also determinative of the spring force does not change because the walls of the bellows cannot abut along an increasingly larger diameter against the outer surface of the beaded rings. The base surface just referred to, or as it might be termed, the base abutment surface refers to the area 9′ which is acted upon by the internal pressure within the bellows. A corresponding area is shown at 9″ in FIGURE 3.

FIGURE 3 illustrates a modification in which the connecting portions 3″ of the bellows walls 1″ which cooperate with beaded rings 44″ are disposed on a diameter larger than the smallest bellows diameter. In order to achieve again the same novel results in accordance with the present invention as obtained in connection with FIGURE 2, it should be noted that the outer surfaces of beaded rings 4″ against which the connecting portions 3″ abut extend essentially parallel to the direction 8″ of spring movement, while the angle α again has a maximum value of about 30°, preferably, however, not in excess of 10°, so as to obtain the same beneficial results. During spring movement in the direction 8″, neither the angle α nor the base abutment surface of bellows 1″ are subjected to any large changes.

While we have shown and described several preferred embodiments in accordance with the present invention, it is understood that the same is not limited thereto but is susceptible to many changes and modifications in accordance with the present invention, and we, therefore, intend to cover all such changes and modifications as encompassed by the appended claims.

We claim:
1. A bellows spring for pneumatic spring systems of motor vehicles comprising bellows means having an axis extending in the direction of spring movement and having connecting portions, a plurality of sealing plate means and annular connecting means cooperating with said connecting portions for retaining said bellows means against said sealing plate means, the portions of said bellows means immediately following said connecting portions extending from said connecting portions in directions toward said axis forming angles not exceeding 30° in the normal rest position of the spring with the direction of spring movement, said connecting portions abutting the radially inmost surfaces of said connecting means, said radially inmost surfaces extending essentially in the direction of spring movement.

2. A bellows spring according to claim 1, wherein said bellows means further includes a bellows wall portion disposed between said plurality of sealing plate means, said bellows wall portion having an inner diameter substantially equal to the inner diameters of said connecting portions when said spring is in said normal rest position.

3. A bellows spring for pneumatic spring systems of motor vehicles comprising bellows means having unitary wall means, connecting portions integral with said unitary wall means, sealing plate means closing the ends of said unitary wall means, said unitary wall means including an intermediate portion having a convex exterior and disposed midway between said sealing plate means, connecting means cooperating with said connecting portions for retaining said unitary wall means against said sealing plate means, further portions of said unitary wall means joining said connecting portions and forming angles not exceeding 30° in the normal position of the spring with the direction of spring movement, said connecting means having radially inwardly facing surfaces extending essentially in the direction of spring movement, said connecting portions abutting said surfaces, the diameters of said surfaces and the maximum diameter of said intermediate portion of said unitary wall means being substantially equal in the normal rest position of said spring.

4. A bellows spring according to claim 3, wherein girder rings surround and reinforce said unitary wall means, said further portions being joined by wall portions of progressively decreasing diameters in directions from said sealing plate means toward said girder rings.

5. A bellows spring for pneumatic spring systems of motor vehicles comprising bellow means having an axis extending in the direction of spring movement, a plurality of sealing plate means and annular connecting means, said annular connecting means comprising contact surfaces, said bellows means comprising connecting portions in contact with said contact surfaces and complementary thereto, said bellows means further comprising further portions extending inwardly from said connecting portions toward said axis in the normal rest position of said spring and free of contact with said contact surfaces, said further portions forming angles not exceeding 30° with lines extending through said connecting portions in the said direction of spring movement.

References Cited in the file of this patent

UNITED STATES PATENTS

| | | |
|---|---|---|
| 1,177,142 | Rudd | Mar. 28, 1916 |
| 1,537,112 | Glackin | May 12, 1925 |
| 2,393,493 | Brown | Jan. 22, 1946 |
| 2,537,637 | Candlin et al. | Jan. 9, 1951 |
| 2,773,686 | Nash | Dec. 11, 1956 |
| 2,790,650 | Boschi | Apr. 30, 1957 |
| 2,848,956 | Deist | Aug. 26, 1958 |

FOREIGN PATENTS

| | | |
|---|---|---|
| 345,548 | Great Britain | Mar. 26, 1931 |
| 400,616 | Great Britain | Oct. 24, 1933 |